(12) United States Patent
Martin et al.

(10) Patent No.: US 7,333,617 B1
(45) Date of Patent: Feb. 19, 2008

(54) METHOD FOR ESTABLISHING A COMMON KEY FOR A GROUP OF AT LEAST THREE SUBSCRIBERS

(75) Inventors: Tobias Martin, Rabenau (DE); Ralf Schaffelhofer, Darmstadt (DE); Joerg Schwenk, Dieburg (DE)

(73) Assignee: Deutsche Telekom AG, Bonn (DE)

( * ) Notice: Subject to any disclaimer, the term of this patent is extended or adjusted under 35 U.S.C. 154(b) by 944 days.

(21) Appl. No.: 10/049,385

(22) PCT Filed: Jul. 10, 2000

(86) PCT No.: PCT/EP00/06510

§ 371 (c)(1),
(2), (4) Date: Jun. 19, 2002

(87) PCT Pub. No.: WO01/13567

PCT Pub. Date: Feb. 22, 2001

(30) Foreign Application Priority Data

Aug. 12, 1999 (DE) ............................... 199 38 198

(51) Int. Cl.
*H04L 9/08* (2006.01)
(52) U.S. Cl. ........................................ 380/283; 380/44
(58) Field of Classification Search ........ 380/277–279, 380/281, 283, 284, 44
See application file for complete search history.

(56) References Cited

U.S. PATENT DOCUMENTS 5,592,552 A * 1/1997 Fiat ............................. 713/163
6,195,751 B1 * 2/2001 Caronni et al. ............. 713/163
6,363,154 B1 * 3/2002 Peyravian et al. .......... 380/283
6,987,855 B1 * 1/2006 Srivastava ................... 380/278
7,260,716 B1 * 8/2007 Srivastava ................... 713/163

FOREIGN PATENT DOCUMENTS

| CH | 678134 | 7/1991 |
| EP | 0535863 | 4/1993 |
| JP | 61063128 | 4/1986 |

OTHER PUBLICATIONS

Schneier, Bruce. Applied Cryptography, Second Edition: Protocols, Algorithms, and Source Code in C. John Wiley & Sons, Inc., 1996. pp. 523-525.*

(Continued)

*Primary Examiner*—Emmanuel L. Moise
*Assistant Examiner*—Zachary A. Davis
(74) *Attorney, Agent, or Firm*—Darby & Darby

(57) ABSTRACT

A method for establishing a common key for a group of at least three subscribers includes using a publicly known mathematical number group and a higher order element of the group g∈G. In the first step, a message corresponding to $N_i := g^{z_i} \mod p$ is sent by each subscriber to all other subscribers ($T_j$), ($z_i$) being a random number chosen from the set $(1, \ldots, p-2)$ by a random number generator. In the second step, each subscriber ($T_i$) selects a transmission key $k_{ij} := (g^{z_j})^{z_i}$ for each other subscriber ($T_j$) from the received message ($g^{z_j}$), with $i \ne j$, for transmitting their random number ($z_i$) to the subscribers ($T_j$). In the third step, the common key k is calculated as $k := f(z_1, z_2, \ldots, z_n)$ for each subscriber $T_i$.

14 Claims, 1 Drawing Sheet

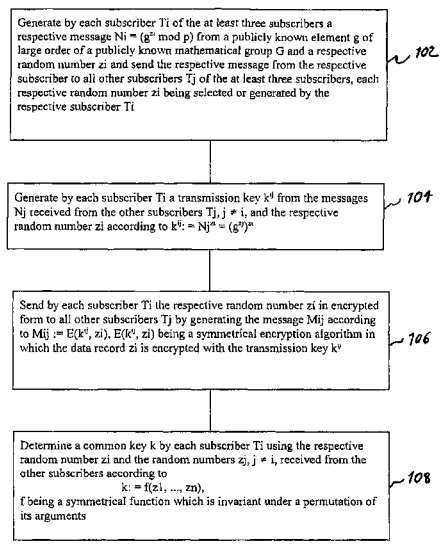

OTHER PUBLICATIONS

Ingemarsson et al. "A Conference Key Distribution System". IEEE Transactions on Information Theory, vol. IT-28, No. 5, Sep. 1982. pp. 714-720.*

Laih et al. "On the design of conference key distribution systems for the broadcasting networks". Proceedings of IEEE INFOCOM '93, vol. 3, Mar. 30-Apr. 1, 1993. pp. 1406-1413.*

Steiner et al. "Diffie-Hellman Key Distribution Extended to Group Communication". ACM, 1996. pp. 31-37.*

Yasinsac et al. "A Family of Protocols for Group Key Genearation in Ad Hoc Networks". Proceedings of the IASTED International Conference on Communications and Computer Networks (CCN02), Nov. 2002. pp. 1-8.*

Kenji Koyama et al. 'Identity-Based Conference Key Distribution Systems' Dec. 1, 2000; pp. 176 to 184.

Kenji Koyama et al.'Security of Improved-Based Conference Key Distribution Systems' Dec. 1, 2000, pp. 12 to 19.

R.E. Lennon et al. 'Cyptographic Key Distribution Using Composite Keys' Mar. 12, 1978; pp. 26.1.1. to 26.1.6.

Mike Burmester et al. 'A Secure and Efficient Conference Key Distribution System' 1995; pp. 275 to 286.

Alfred J. Menezes et al. 'Handbook of Applied Cryptography—Conference keying' 1997; pp. 528 to 529.

W. Diffie et al., "New Directions in Cryptography", IEEE Transactions on Information Theory, vol. IT-22, No. 6, Nov. 1976, pp. 644-654.

Internet Engineering Task Force Request for Comments 2412 (IETF RFC 2412): The Oakley Key Determination Protocol, The Internet Society, Network Working Group, H. Orman, Nov. 1998, pp. 1-55.

M. Steiner et al., "Diffie-Helllman Key Distribution Extended to Group Communication", 3$^{rd}$ ACM Conference on Computer and Communications Security, Mar. 14-16, 1996, New Delhi, India, pp. 31-37.

M. Burmester et al., "Efficient and Secure Conference-Key Distribution", Security Protocols International Workshop, Cambridge, United Kingdom, Proceedings, M. Lomas, Ed., Apr. 10-12, 1996, pp. 119-129.

T. Elgamal, "A Public Key Cryptosystem and a Signature Scheme Based on Discrete Logarithms", IEEE Transactions on Information Theory, vol. IT-31, No. 4, Jul. 1985, pp. 469-472.

M. Burmester et al., "A Secure and Efficient Conference Key Distribution System", Proc. EUROCRYP'94, Springer LNCS, Berlin 1994, pp. 275-286.

* cited by examiner

Generate by each subscriber Ti of the at least three subscribers a respective message $Ni = (g^{zi} \bmod p)$ from a publicly known element g of large order of a publicly known mathematical group G and a respective random number zi and send the respective message from the respective subscriber to all other subscribers Tj of the at least three subscribers, each respective random number zi being selected or generated by the respective subscriber Ti ~ 102

Generate by each subscriber Ti a transmission key $k^{ij}$ from the messages Nj received from the other subscribers Tj, j ≠ i, and the respective random number zi according to $k^{ij} := Nj^{zi} = (g^{zj})^{zi}$ ~ 104

Send by each subscriber Ti the respective random number zi in encrypted form to all other subscribers Tj by generating the message Mij according to $Mij := E(k^{ij}, zi)$, $E(k^{ij}, zi)$ being a symmetrical encryption algorithm in which the data record zi is encrypted with the transmission key $k^{ij}$ ~ 106

Determine a common key k by each subscriber Ti using the respective random number zi and the random numbers zj, j ≠ i, received from the other subscribers according to
  $k := f(z1, ..., zn)$,
f being a symmetrical function which is invariant under a permutation of its arguments ~ 108

FIG. 1

METHOD FOR ESTABLISHING A COMMON KEY FOR A GROUP OF AT LEAST THREE SUBSCRIBERS

CROSS-REFERENCE TO RELATED APPLICATIONS

This application is a U.S. National Stage Application under 35 U.S.C. §371 of PCT International Application No. PCT/EP00/06510, filed Jul. 10, 2000, which claims priority to German Patent Application No. DE 199 38 198.4, filed Aug. 12, 1999. Each of these applications is incorporated herein by reference as if set forth in its entirety.

The present invention relates to a method for establishing a common key within a group of subscribers using a publicly known mathematical group and a publicly known element of the group.

Encryption methods of varied types belong to state of the art and increasingly have commercial importance. They are used for sending messages over commonly accessible transmission media, but only the owners of a cryptokey are able to read these messages in plain text.

A known method for establishing a common key over unsecure communication channels is, for example, the method by W. Diffie and W. Hellmann (see DH-Method W. Diffie and M. Hellmann, see New Directions in Cryptography, IEEE Transaction on Information Theory, IT-22(6): 644-654, November 1976).

The basis of the Diffie Hellmann key exchange (DH-key exchange) is the fact that it is virtually impossible to compute logarithms modulo a large prime number p. In the example depicted below, Alice and Bob make use of this in that they each secretly select a number x or y, respectively, which are smaller than p (and relatively prime to p−1). Then, they (successively or simultaneously) send each other the $x^{th}$ (or $y^{th}$) power modulo p of a publicly known number $\alpha$. They are able to compute a common key $K:=\alpha^{xy}$ mod p from the received powers by another exponentiation modulo p with x or y, respectively. An attacker who sees only $\alpha^x$ mod p and $\alpha^y$ mod p cannot compute K therefrom. (The only method for this which is known today would be to initially compute the logarithm, for example, of $\alpha^x$ to base $\alpha$ modulo p, and to subsequently exponentiate $\alpha^y$ therewith.)

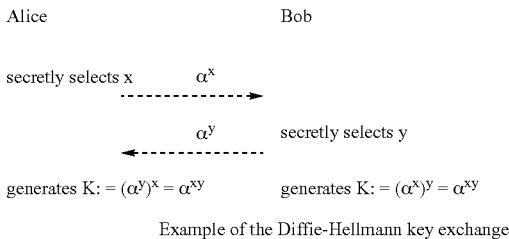

Example of the Diffie-Hellmann key exchange

A difficulty of the DH-key exchange lies in that Alice does not know whether she actually communicates with Bob or with a cheater. In the IPSec-Standards of the Internet Engineering Task Force (IETF RFC 2412: The OAKLEY Key Determination Protocol), this problem is solved by using public key certificates in which the identity of a subscriber is combined with a public key by a trust center. In this manner, the identity of an interlocutor becomes verifiable.

The DH-key exchange can also be carried out using other mathematical structures, for example, with finite bodies GF ($2^n$) or elliptical curves. Using these alternatives, it is possible for the performance to be improved. However, this method is only suitable to agree upon a key between two subscribers.

Several attempts have been made to extend the DH method to three or more subscribers (group DH). An overview of the related art is offered by M. Steiner, G. Tsudik, M. Waidner in Diffie-Hellmann Key Distribution Extended to Group Communication, Proc. $3^{rd}$ ACM Conference on Computer and Communications Security, March 1996, New Delhi, India.

An extension of the DH method to subscribers A, B and C is described, for example, by the following table (the calculation is in each case mod p):

| Subscriber A; B; C | A → B | B → C | C → A |
|---|---|---|---|
| $1^{st}$ round | $g^a$ | $g^b$ | $g^c$ |
| $2^{nd}$ round | $g^{ca}$ | $g^{ab}$ | $g^{bc}$ |

Subsequent to carrying out these two rounds, each of the subscribers is able to compute secrete key $g^{abc}$ mod p.

Known from Burmester, Desmedt, A secure and efficient conference key distribution system, Proc. EUROCRYPT'94, Springer LNCS, Berlin 1994 is, moreover, a design approach in which two rounds are required for generating the key, it being necessary to send n messages of length p=approx. 1000 bits for n subscribers in the second round.

Further relevant design approaches are known from M. Burmester and Y. Desmedt, Efficient and secure conference key distribution, Cambridge Workshop on Security Protocols, Springer LNCS 1189, pp 119-129 (1996). However, it is assumed here that secure channels already exist between the subscribers.

Known from Menezes et al: "Handbook of applied cryptography" 1997 CRC Press. Boca Raton (US) XP002152150 is a method for establishing a common key involving at least three subscribers. In this design approach, a group member (chair) is defined from whom all activities originate. The selection of common key K lies solely with the chair. Subsequently, common key K is sent from the chair to every group member on the basis of the Diffie-Hellman keys determined in pairs, respectively. Thus, common key K is always just as good as it has been selected by the chair.

In Lennon R E et al: "Cryptographic key distribution using composite keys" Birmingham, Ala., Dec. 3-6, 1978, New York. IEEE, US Vol. CONF. 1978, Dec. 3, 1978 (Dec. 3, 1978), pp. 26101-26116-6. XP002098158, a key exchange method is described which is limited to two subscribers. In this design approach, each subscriber generates his/her own random number and sends it to the other subscriber in encrypted form. The common key is then determined by each subscriber from the own random number and the encrypted random number received from the other subscriber, using a symmetrical function (EXC-OR).

In all of these extensions, at least one of the following problems occurs:

The subscribers have to be organized in a specific fashion; in the above example, for instance, as a circle, that is, a structure of the subscriber group must previously be known.

If a central unit is used to coordinate the key agreement, then the subscribers have no influence on the selection of the key with respect to this central unit.

The number of rounds depends on the number of subscribers.

For the above reasons, these methods are generally difficult to implement and require considerable computational outlay.

The further development of the DH method to a public key method is known from T. ElGamal "A Public Key Cryptosystem and a Signature Scheme Based on Discrete Logarithms.", IEEE Transactions on Information Theory, July 1985.

SUMMARY OF THE INVENTION

An object of the present invention is to provide a method for generating a common key within a group of at least three subscribers. The intention is for the method to be designed in such a manner that it stands out over the known methods by a small computational outlay and a small communication requirement (few rounds even in the case of many subscribers). At the same time, however, it is intended to have a comparable security standard as the DH method. The method has to be easy to implement. Information on the structure of the group should not be required for carrying out the method.

The present invention provides a method for establishing a common key for a group of at least three subscribers. The method comprises:
  generating by each subscriber Ti of the at least three subscribers a respective message $N_i = (g^{z_i} \mod p)$ from a publicly known element g of large order of a publicly known mathematical group G and a respective random number zi and sending the respective message from the respective subscriber to all other subscribers Tj of the at least three subscribers, each respective random number zi being selected or generated by the respective subscriber Ti;
  generating by each subscriber Ti a transmission key $k^{ij}$ from the messages Nj received from the other subscribers Tj, j≠i, and the respective random number zi according to $k^{ij} := N_j^{z_i} = (g^{z_j})^{z_i}$;
  sending by each subscriber Ti the respective random number zi in encrypted form to all other subscribers Tj by generating the message Mij according to $M_{ij} := E(k^{ij}, z_i)$, $E(k^{ij}, z_i)$ being a symmetrical encryption algorithm in which the data record zi is encrypted with the transmission key $k^{ij}$; and
  determining a common key k by each subscriber Ti using the respective random number zi and the random numbers zj, j≠i, received from the other subscribers according to $$k := f(z1, \ldots, zn),$$

f being a symmetrical function which is invariant under a permutation of its arguments.

The method according to the present invention which satisfies this problem definition is based on the same mathematical structures as the DH method and has therefore comparable security features. In comparison with the group DH methods proposed heretofore, however, it is considerably more efficient with regard to the computational outlay and communication requirement.

In the following, the operating principle of the method will be explained in greater detail. The defined subscribers of the method are denoted by T1-Tn and each individual that is not specifically named a subscriber is denoted by Ti. All other subscribers involved in the method are denoted by Tj except for the respective subscriber Ti. The publicly known components of the method are a publicly known mathematical group G, preferably the multiplicative group of all integral numbers modulo a large prime number p, and an element g of group G, preferably a number 0<g<p having large multiplicative order. However, it is also possible to use other suitable mathematical structures for group G, for example, the multiplicative group of a finite body or the group of the points of an elliptical curve. In the following, the method will be described on the basis of the group of numbers modulo a prime number p.

The method is based on four method steps.

In the first method step, a message of the form $N_i = g^{z_i} \mod p$ is generated by each not specifically named subscriber Ti and sent to all other subscribers Tj, zi preferably being a random number from the set $\{1, \ldots p-2\}$ selected via a random-number generator.

In the second method step, each subscriber Ti computes a common transmission key $k^{ij} := (g^{z_j})^{z_i}$ from received message $g^{z_j}$ for each further subscriber Tj, where i≠j. Since $k^{ij} = k^{ji}$ applies, subscribers Ti and Tj now know a common transmission key $k^{ij}$ and can therefore communicate confidentially.

In the third method step, each subscriber Ti uses transmission key $k^{ij}$ to confidentially send his/her random number zi to the other subscribers Tj, respectively. In the process, the encryption of random number zi with transmission key $k^{ij}$ is carried out using a symmetrical encryption method. This means that, upon completion of the method step, each subscriber Ti knows the encrypted random numbers of all other subscribers Tj in addition to his/her own random number so that the conditions are given for computing a common key k.

In the fourth method step, common key k is computed according to equation $$k = f(z1, z2, \ldots, zn)$$

at each subscriber Ti, with f being an arbitrary symmetrical function. In this case, symmetry means that the value of the function remains the same even when arbitrarily exchanging the arguments. Examples of symmetrical functions include
  the multiplication in a (finite) body: $k := z1 \cdot \ldots \cdot zn$,
  the addition in a (finite) body: $k := z1 + \ldots + zn$,
  the bitwise XOR of zi: $k := z1 \oplus \ldots \oplus zn$,
  the exponentiation of g with zi: $k := g^{z1 \cdots zn}$
  countless further possibilities.

The transmission of the messages generated in steps 1 and 2 can be carried out both via point-to-point connections and by broadcast or multicast.

BRIEF DESCRIPTION OF THE DRAWING

FIG. 1 shows a flow chart of a method for establishing a common key within a group of subscribers.

DETAILED DESCRIPTION

Referring to FIG. 1, in a method according to the present invention for establishing a common key within a group of subscribers, by each subscriber Ti of the at least three subscribers a respective message $N_i = (g^{z_i} \mod p)$ is generated from a publicly known element g of large order of a publicly known mathematical group G and a respective random number zi and the respective message is sent from the respective subscriber to all other subscribers Tj of the at least three subscribers (see block 102). Each respective random number zi is selected or generated by the respective subscriber Ti. Then, by each subscriber Ti, a transmission key $k^{ij}$ is generated from the messages Nj received from the other subscribers Tj, j≠i, and the respective random number zi according to $k^{ij}:=Nj^{zi}=(g^{zj})^{zi}$ (see block 104). By each subscriber Ti, the respective random number zi is sent in encrypted form to all other subscribers Tj by generating the message Mij according to Mij:=$E(k^{ij}, zi)$, where $E(k^{ij}, zi)$ is a symmetrical encryption algorithm in which the data record zi is encrypted with the transmission key $k^{ij}$ (see block 106). Finally, a common key k is determined by each subscriber Ti using the respective random number zi and the random numbers zj, j≠i, received from the other subscribers according to k:=f(z1, . . . , zn), where f is a symmetrical function which is invariant under a permutation of its arguments (see block 108).

In the following, the method according to the present invention will be explained in greater detail in the light of a concrete example for three subscribers A, B and C. However, the number of subscribers can be extended to an arbitrary number of subscribers.

In this example, the length of number p is 1024 bits; g has a multiplicative order of at least $2^{160}$.

The method according to the present invention is executed according to the following method steps:

1. Subscriber A sends Na=$g^{za}$ mod p to subscribers B and C, subscriber B sends Nb=$g^{zb}$ mod p to subscribers A and C, and subscriber C sends Nc=$g^{zc}$ mod p to subscribers A and B.

2. Subscriber A computes kab=$Nb^{za}$ mod p and kac=$Nc^{za}$ mod p. Subscribers B and C proceed analogously.

3. Subscriber A sends message Mab=E(kab, za) to subscriber B and message Mac=E(kac, za) to subscriber C. Here, E(k, m) denotes the symmetrical encryption of the data record with algorithm E under transmission key $k^{ij}$. Subscribers B and C proceed analogously.

The method described above makes do with the minimum number of two rounds between subscribers A, B and C. The number of rounds required for carrying out the method according to the present invention remains limited to two rounds even with an arbitrary number of subscribers T1-Tn.

A variant of the method is to assign a special role to one of subscribers T1-Tn for the execution of the second method step. If this role is assigned, for example, to subscriber T1, then method steps 2 and 3 are executed only by subscriber T1. In fourth method step, all subscribers T1-Tn involved in the method compute common key k according to the assignment k:=h(z1, $g^{z2}$, . . . , $g^{zn}$), it being required for h(x1, x2, . . . , xn) to be a function which is symmetrical in arguments x2, . . . xn. This variant drastically reduces the number of messages to be sent. An example of such a function h is, for instance, $$k:=h(z1, g^{z2}, \ldots, g^{zn})=g^{z1 \cdot z1} \cdot g^{z2 \cdot z1} \ldots g^{zn \cdot z1}.$$

The method according to the present invention can be advantageously used to generate a cryptographic key for a group of a several or at least three subscribers.

List of Reference Symbols

| | |
|---|---|
| T1-Tn | subscribers 1 through n |
| Ti | undefined subscriber of T1-Tn |
| Tj | undefined subscriber of T1-Tn, different from Ti. |
| N | message |
| Ni | message of an undefined subscriber Ti |
| Mab | message of subscriber A to subscriber B |
| G | publicly known mathematical group |
| g | element of group G |

-continued

| | |
|---|---|
| p | large prime number |
| z | random number from the set (1, . . . p-2) selected via a random-number generator |
| $k^{ij}$; $k^{1j}$ | common transmission key |
| k | common key |
| E(,) | algorithm |
| m | data record |
| f(x1, x2, . . . , xn) | function symmetrical in x1, x2, . . . , xn. |
| h(x1, x2, . . . , xn) | function symmetrical in arguments x2, . . . , xn. |
| A; B; C | designation of the subscribers in the exemplary embodiment |

What is claimed is:

1. A method for establishing a common key for a group of at least three subscribers for transmitting messages over a communication channel, the method comprising the steps of:

generating, by each subscriber $T_j$, a respective message $N_j$=($g^{zj}$ mod p) from a publicly known element g of large order of a publicly known mathematical group G and a respective random number zj, j=1 to n, where n is the number of subscribers in the group of at least three subscribers;

sending the respective message Nj, by each subscriber, to each of the other subscribers $T_j$;

encrypting, by a first subscriber $T_1$, the received messages $N_j$ of the other subscribers $T_j$, j≠1, with the random number z1 to form a respective transmission key $k^{1j}$ for each subscriber $T_j$, j≠1;

computing, by each subscriber $T_j$, j≠1, a symmetrical counterpart $k^{j1}$ of the respective transmission key $k^{1j}$ using the received message $N_1$;

sending, by the first subscriber $T_1$, the random number z1 to all other subscribers $T_j$, j≠1 in encrypted form by generating a message $M_{1j}$ according to $M_{1j}$:=$E(k^{1j}, z1)$, $E(k^{1j}, z1)$ being a symmetrical encryption algorithm in which the random number z1 is encrypted with the transmission key $k^{1j}$;

decrypting, by each subscriber $T_j$, the message $M_{1j}$;

determining a common key k, by each subscriber Tj, using an assignment k:=h(z1, $g^{x2}$, . . . , $g^{xn}$), h(x1, x2, . . . , xn) being a function which is symmetrical in the arguments x2, . . . , xn;

encrypting, by one of the subscribers $T_i$, a transmission message using the common key k; and transmitting the encrypted transmission message to at least one of the other subscribers $T_j$, j≠i.

2. The method as recited in claim 1 wherein the transmission key is known to each subscriber $T_j$ according to $k^{1j}=k^{j1}$.

3. The method according to claim 1, further comprising the step of:

decrypting, by the at least one of the other subscribers $T_j$, j≠i, the transmitted transmission message using the common key k.

4. A method for establishing a common key for a group of subscribers for encryption and decryption of messages, the method comprising the steps of:

each of the subscribers $T_j$ generating a respective random number zj, where j goes from 1 to n and n is the number of subscribers in the group of subscribers;

each of the subscribers $T_j$ generating a respective first message $N_j$=($g^{zj}$ mod p) from a publicly known element g of large order of a publicly known mathematical group G;

each of the subscribers $T_j$ sending the respective first message $N_j$ to each of the other subscribers $T_j$;

a first subscriber $T_1$ computing a transmission key $k^{1j}=N_j^{z1}$ mod p for each of the other subscribers $T_j$, $j \neq 1$ based on the received respective first message $N_j$, $j \neq 1$;

each of the subscribers $T_j$, $j \neq 1$, computing a symmetrical counterpart $k^{j1}$ of the respective transmission key $k^{1j}$ using the received first message $N_1$;

the first subscriber $T_1$ encrypting a second message $M_{1j}:=E(k^{1j}, z1)$ for each of the other subscribers $T_j$, $j \neq 1$, where $E(k^{1j}, z1)$ is a symmetrical encryption algorithm in which z1 is encrypted with the transmission key $k^{1j}$;

the first subscriber $T_1$ sending the encrypted second message $M_{1j}$ to each of the other subscribers $T_j$, $j \neq 1$; and each of the subscribers $T_j$ decrypting the second message $M_{1j}$;

each of the subscribers $T_j$ computing a common key k according to an assignment $k:=h(z1, g^{z2}, \ldots g^{zn})$, where $h(x1, x2 \ldots xn)$ is a symmetrical function;

a subscriber $T_i$ encrypting a third message using the common key k; and the subscriber $T_i$ transmitting the encrypted third message to at least one of the other subscribers $T_j$, $j \neq i$.

5. The method according to claim 4, wherein each respective random number zj is selected from the set $\{1, \ldots p-2\}$.

6. The method according to claim 4, wherein the length of p is at least 1024 bits.

7. The method according to claim 4, wherein g has a multiplicative order of at least $2^{160}$.

8. The method according to claim 4 wherein the transmission key is known to each respective subscriber $T_j$ according to $k^{1j}=k^{j1}$.

9. The method according to claim 4, wherein $h(z1, g^{z2}, \ldots g^{zn})=g^{z1*z1}*g^{z2*z1}* \ldots g^{zn*z1}$.

10. The method according to claim 4, further comprising the step of:

the at least one other subscriber $T_j$, $j \neq i$ decrypting the received third message using the common key k.

11. A method for establishing a common key for a group of subscribers for encryption and decryption of messages, the method comprising the steps of:

each of the subscribers $T_j$ generating a respective random number zj, where j goes from 1 to n and n is the number of subscribers in the group of subscribers;

each of the subscribers $T_j$ storing the respective random number zj in a respective memory;

each of the subscribers $T_j$ generating a respective first message $N_j=(g^{zj} \bmod p)$ from a publicly known element g of large order of a publicly known mathematical group G;

each of the subscribers $T_j$ sending the respective first message $N_j$, $j \neq 1$ to each of the other subscribers $T_j$;

the first subscriber $T_1$ storing each of the receiving first messages $N_j$, $j \neq 1$ in a memory;

the first subscriber $T_1$ computing a transmission key $k^{1j}=N_j^{z1}$ mod p for each of the other subscribers $T_j$, $j \neq 1$, based on the received respective first message $N_j$, $j \neq 1$;

each of the subscribers $T_j$, $j \neq 1$, computing a symmetrical counterpart $k^{j1}$ of the respective transmission key $k^{1j}$ using the received first message $N_1$;

the first subscriber $T_1$ encrypting a second message $M_{1j}:=E(k^{1j}, z1)$ for each of the other subscribers $T_j$, $j \neq 1$, where $E(k^{1j}, z1)$ is a symmetrical encryption algorithm in which z1 is encrypted with the transmission key $k^{1j}$;

the first subscriber $T_1$ sending the encrypted second message $M_{1j}$ to each of the respective other subscribers $T_j$, $j \neq 1$;

each of the respective other subscribers $T_j$, $j \neq 1$, storing the received encrypted second message in the respective memory; and each of the subscribers $T_j$ decrypting the second message $M_{1j}$;

each of the subscribers $T_j$ computing a common key k according to an assignment $k:=h(z1, g^{z2}, \ldots g^{zn})$, where $h(x1, x2 \ldots xn)$ is a symmetrical function, and n is the number of subscribers in the group;

one of the subscribers $T_i$ encrypting a third message using the common key k; and the subscriber $T_i$ transmitting the encrypted third message to at least one of the other subscribers $T_j$, $j \neq i$.

12. The method according to claim 11, whereby a maximum number of transmission rounds required is two.

13. The method according to claim 11, further comprising the steps of:

the subscriber $T_i$ transmitting the encrypted third message to each of the other respective subscribers $T_j$, $j \neq i$;

each of the other respective subscribers $T_j$, $j \neq i$ decrypting the received encrypted third message using the computed common k.

14. The method according to claim 11, further comprising the step of:

the at least one other subscriber $T_j$, $j \neq i$ decrypting the received third message using the common key k.

* * * * *